July 14, 1953 J. E. HOLMES 2,645,010
HEDGE TRIMMER
Original Filed March 11, 1946 2 Sheets-Sheet 1
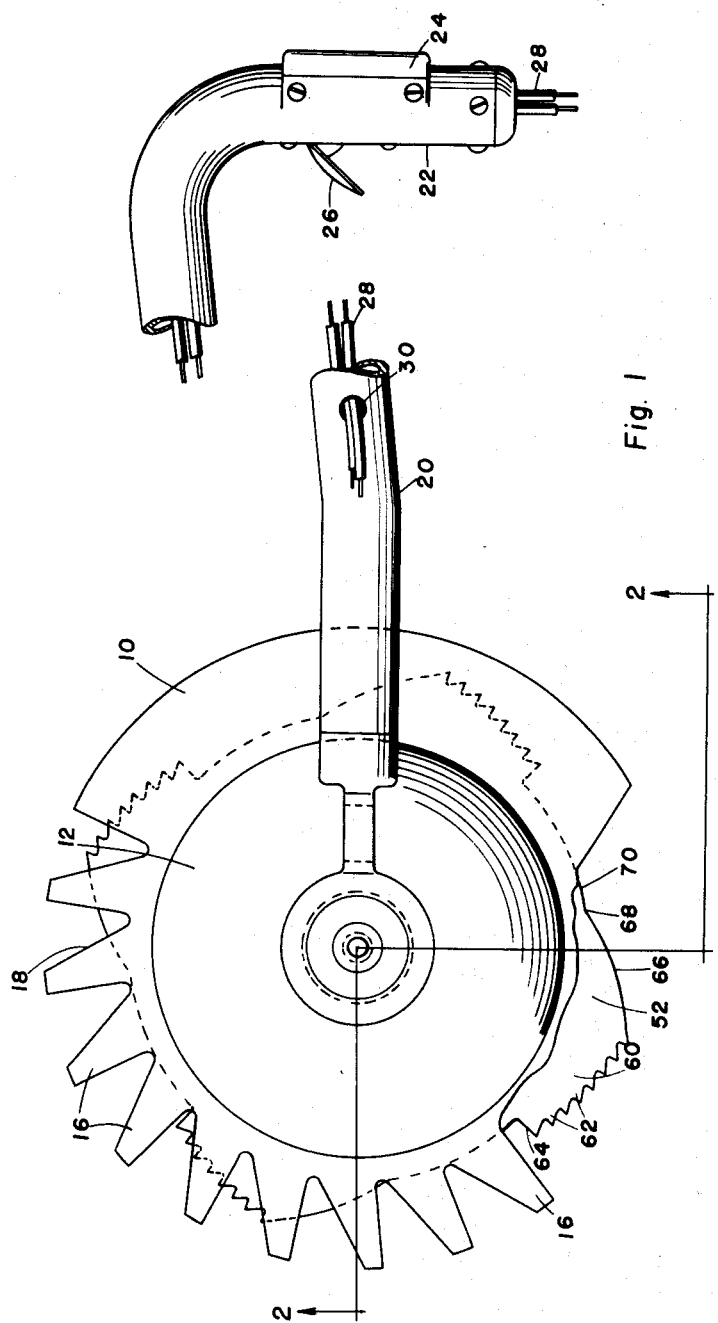
Fig. I
INVENTOR.
JOSEPH E. HOLMES
BY
*Knox & Knox*
AGENTS July 14, 1953 — J. E. HOLMES — 2,645,010
HEDGE TRIMMER
Original Filed March 11, 1946 — 2 Sheets-Sheet 2
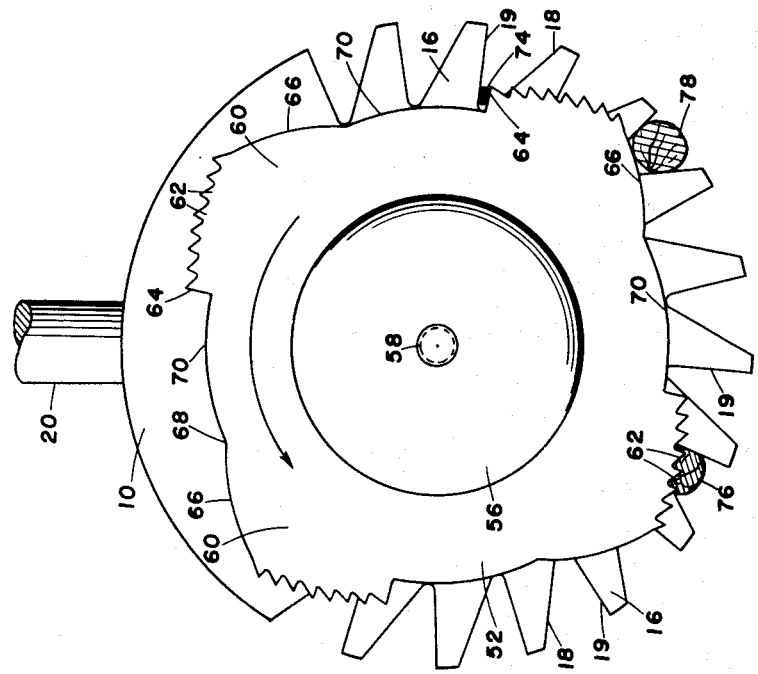
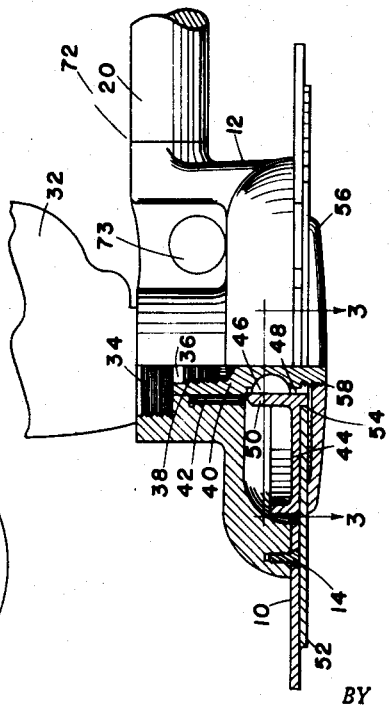
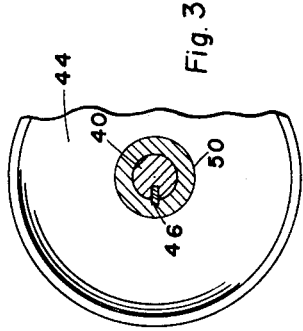
INVENTOR.
JOSEPH E. HOLMES
BY
*Knox & Knox*
AGENTS Patented July 14, 1953

2,645,010

UNITED STATES PATENT OFFICE 2,645,010

HEDGE TRIMMER

Joseph E. Holmes, Huntington Park, Calif., assignor of one-half to Ester Holmes, Huntington Park, Calif.

Substituted for abandoned application Serial No. 653,529, March 11, 1946. This application September 2, 1952, Serial No. 307,494

7 Claims. (Cl. 30—144)

The present invention relates generally to a hedge trimmer and more particularly to a hedge trimmer which will operate efficiently on all kinds of shrubbery or the like.

This is a substitute application for my abandoned application, Serial No. 653,529, filed March 11, 1946.

The primary object of this invention is to provide a hedge trimmer which will cut small limbs and large limbs simultaneously, thus being adapted for use on all kinds of hedges, shrubbery or the like.

Another object of this invention is to provide a hedge trimmer of the type described having a rotating cutter of substantially circular form, but having shearing elements as well as sawing elements which operate either alternately or simultaneously.

Another object of this invention is to provide a hedge trimmer of the type described having a ledger or stationary blade consisting of a plurality of fingers or guides which will hold the twigs and limbs of the hedge in position while the rotating cutter severs them, the above mentioned shearing and sawing elements being functional throughout the major portion of the complete periphery of the ledger plate.

Another object of this invention is to provide a hedge trimmer of the type described in which the rotating cutter is driven by means of an electric motor, or similar power unit, at high speed but without the usual tendency to jam or to vibrate excessively.

Another object of this invention and this disclosure, ancillary to the immediately preceding object, is to teach the best known mode of carrying the invention into actual practice.

Another object of this invention is to provide a hedge trimmer which is adapted for fabrication from many different materials, so that the choice of material can be according to the dictates of availability and price considerations, the exact sizes and proportions being matters easily determined to suit particular conditions and needs.

Finally, it is an object to provide a hedge trimmer of the aforementioned character which is simple, safe and convenient to operate, and which will give generally efficient and durable service.

With these and other objects definitely in view, this invention consists in the novel construction, combination and arrangement of elements and portions, as will be hereinafter fully described in the specification, particularly pointed out in the claims, and illustrated in the drawing which forms a material part of this disclosure and wherein similar characters of reference indicate similar or identical elements and portions throughout the specification and throughout the views of the drawing, and in which:

Fig. 1 is a plan view of the hedge trimmer with the power unit omitted for clarity.

Fig. 2 is a setcional view taken on the line 2—2 of Fig. 1.

Fig. 3 is a fragmentary sectional view taken on the line 3—3 of Fig. 2.

Fig. 4 is an inverted plan view of the working section of the hedge trimmer, the figure being proposed as illustrating the shearing action in connection with small limbs or twigs, the sawing of a larger limb, and the action of the specially designed toothed elements in preventing shimmying or undue vibration during use.

Referring now to the drawing in detail, Fig. 1 shows a hedge trimmer in which a ledger or stationary cutter blade 10 is secured to a housing 12 by means of screws 14, said ledger or stationary blade having about its periphery a plurality of fingers or guides 16. The guides are small in width at their outer edges and taper gradually to a greater width at their roots thus forming slots of substantially V-shaped form as indicated at 18. The shear edges 19 of the guides 16 extend radially while the opposing edges of the slots 18 are non-radially disposed. The housing 12 is attached to a handle 20 having at its end a hand grip 22 containing a switch 24 operated by means of a trigger 26. Said switch controls a flow of electrical current in wires 28 which are carried within the handle 20, emerging from said handle at grommet 30 and extended to the motor 32. The motor 32 is provided with an externally screw threaded boss 34 engaging an internally screw threaded socket portion in housing 12. The shaft of motor 32 is similarly externally screw threaded and engages with an internally screw threaded portion 38 of a drive shaft 40 which is rotatably mounted in housing 12 by means of a bearing 42. A drive plate 44 is secured to the drive shaft 40 by means of a key 46 engaged in a slot 48 of the hub 50. A rotating cutter 52 is centrally located on the drive plate 44 by means of a hub extension 54 and is retained in position by means of a clamp plate 56 secured to a screw threaded portion 58 of the drive shaft 40. The rotating cutter 52 has about its periphery four equally spaced projections or individual teeth 60, each provided with a plurality of saw teeth 62 commencing at a shear edge 64 and extending along the outer edge of the segment, it being noted that the radius of each projection or tooth 60 is gradually increased from the shear edge 64 to a trailing portion 66 the edge of which defines an arc of gradually decreasing radius to a point 68 on the basic radius edge 70 of the rotating cutter.

To operate the hedge trimmer the handle is grasped near the housing 12 at a position indicated by the numeral 72, a finger being extended through the hole 73 if desired. The other hand should grasp the hand grip 22 and the rotating cutter set in operation by depressing the trigger 26 of the switch 24. When the hedge trimmer is applied to the shrubbery to be trimmed a number of limbs will enter the slots 18. Small limbs will be forced to the bottom of the slots as indicated at 74 in Fig. 4 and will be cut off due to the shearing action between the shear edge 64 and the shearing edges 19 of the ledger plate 16. Larger limbs will enter the slots partially as indicated at 76 in Fig. 4 and will be cut by the saw 62. Due to the fact that the saw teeth 62 are positioned on an arc of gradually increasing radius each tooth will cut successively deeper into the limb thus relieving any sudden loads on the motor which would occur if too deep a cut were attempted at one time. When all the saw teeth of one projection or individual tooth 60 have passed through the limb completing their cutting action, the limb will be engaged by the trailing portion 66 as indicated at 78 in Fig. 4, thus momentarily delaying the tendency of the limb to fall further into the slot. It has been found in practice that this delaying action at a critical point in the rotation of the cutter will prevent jamming of the cutter as would take place if the limb was allowed to fall directly into the path of the shear edge 64. The cutter 52 is driven by the electric motor at a high R. P. M. and the mass and inertia of the trimmer is sufficient to prevent jamming of the cutter since the time interval between successive contacts of the projection or tooth is small and the trailing portions 76 greatly reduce the tendency for the limb to enter between the projection or tooth. Nevertheless, the advantage of a wide circumferential distance between teeth 60 is preserved, allowing the smaller, more resilient limbs and twigs ample opportunity to reach the ledger or stationary cutter blade at the basic radius line 70 so that they will be sheared by the shear edges 64, while the number of saw teeth on the cutter is reduced so that only a small motor is enabled to do the required work. It must be pointed out that this action constitutes a distinct improvement over the action of the hedge trimmer described in the aforementioned abandoned application.

It will be obvious that the power unit of this hedge trimmer need not be limited to an electric motor but may be of any suitable type such as a compressed air motor or a gasoline engine.

The operation of this invention will be clearly comprehended from a consideration of the foregoing description of the mechanical details thereof, taken in connection with the drawing and the above recited objects. It will be obvious that all said objects are amply achieved by this invention.

Further description would appear to be unnecessary.

It is understood that minor variation from the form of the invention disclosed herein may be made without departure from the spirit and scope of the invention, and that the specification and drawings are to be considered as merely illustrative rather than limiting.

I claim:
1. In a hedge trimmer of the class described, the combination of a stationary cutter blade having a plurality of converging notched teeth about its periphery, a revolving cutter having a plurality of individual teeth revolubly mounted relatively to said stationary cutter and contiguous therewith whereby the teeth of said revolving cutter pass adjacent the teeth of said stationary cutter, the shearing edge of the teeth of said stationary cutter being substantially in radial alignment with the axis thereof, the leading edge of the teeth of said revolving cutter being substantially in radial alignment with the axis thereof, and having saw teeth at the extremities thereof, the roots of which are outwardly of the roots of said individual teeth.

2. In a hedge trimmer of the class described, the combination of a stationary cutter blade having a plurality of notched teeth about its periphery, a revolving cutter having a plurality of teeth revolubly mounted relatively to said stationary cutter and contiguous therewith whereby the teeth of said revolving cutter pass adjacent the teeth of said stationary cutter, the leading edges of the teeth of said revolving cutter being substantially parallel with the shearing edge of the teeth of said stationary cutter, each individual tooth of said revolving cutter having a plurality of saw teeth at its outer edge and extending radially beyond the root of said saw teeth toward the axis of said revolving cutter.

3. In a hedge trimmer of the class described, the combination of a stationary cutter blade having a plurality of notched teeth about its periphery, a revolving cutter having a plurality of teeth revolubly mounted relatively to said stationary cutter and contiguous therewith whereby the teeth of said revolving cutter pass adjacent the teeth of said stationary cutter, the leading edges of the teeth of said revolving cutter being substantially parallel with the shearing edge of the teeth of said stationary cutter, each individual tooth of said revolving cutter having a plurality of saw teeth at its outer edge and extending radially beyond the root of said saw teeth toward the axis of said revolving cutter, said saw teeth being of different radially disposed extension from the axis of the revolving cutter whereby each successive adjacent saw tooth extends slightly further radially from the leading edge of the individual teeth of said revolving cutter toward the trailing edge of said individual teeth.

4. In a hedge trimmer of the class described, the combination of a stationary cutter blade having a plurality of notched teeth about its periphery, a revolving cutter having a plurality of teeth revolubly mounted relatively to said stationary cutter and contiguous therewith whereby the teeth of said revolving cutter pass adjacent the teeth of said stationary cutter, the leading edges of the teeth of said revolving cutter being substantially parallel with the shearing edge of the teeth of said stationary cutter, each individual tooth of said revolving cutter having a plurality of saw teeth at its outer edge, and extending radially beyond the root of said saw teeth toward the axis of said revolving cutter, said saw teeth being of different radially disposed extension from the axis of the revolving cutter whereby each successive adjacent saw tooth extends slightly farther radially from the leading edge of the individual teeth of the said revolving cutter toward the trailing edge of said individual teeth, a motor in axial alignment with said revolving cutter, a frame interconnecting said motor and said stationary cutter, a shaft for said revolving cutter in operative relation with said motor and a pair of clamping plates secured on opposite sides of the revolving cutter in connection with said shaft.

5. In a hedge trimmer of the class described, the combination of a substantially circular stationary cutter having a plurality of notched teeth about the periphery thereof having shearing edges, a revolving cutter contiguous with said stationary cutter and having a lesser number of individual teeth than the stationary cutter, the leading edges of said individual teeth being parallel with said shearing edges and adapted to cooperate with the shearing edges of the teeth of said stationary cutter, the outer edges of said individual teeth being provided with a plurality of saw teeth each radially extended slightly beyond the adjacent saw tooth whereby the saw tooth at the leading edge of the individual tooth of said revolving cutter is on a shorter radius than the saw teeth nearing the trailing edge of each individual tooth of said revolving cutter, each of said individual teeth extending inwardly beyond the roots of said saw teeth.

6. Apparatus according to claim 1 and wherein said revolving cutter has a basic radius edge between said individual teeth, and said individual teeth include trailing portions having smooth edge faces extending from the rearmost of said saw teeth to said basic radius edge.

7. Apparatus according to claim 6 and wherein said smooth edge faces of the trailing portions define arcs of constantly decreasing radius from said rearmost saw teeth to said basic radius edge.

JOSEPH E. HOLMES.

References Cited in the file of this patent

UNITED STATES PATENTS

| Number | Name | Date |
|---|---|---|
| D. 144,433 | Virze | Apr. 9, 1946 |
| 616,214 | Underwood | Dec. 20, 1898 |
| 1,272,795 | Goddard | July 6, 1918 |
| 2,153,771 | Orr | Apr. 11, 1939 |

FOREIGN PATENTS

| Number | Country | Date |
|---|---|---|
| 2,875 | Germany | Feb. 2, 1878 |
| 581,504 | Great Britain | Oct. 15, 1946 |